(12) United States Patent
Scalora et al.

(10) Patent No.: US 6,339,493 B1
(45) Date of Patent: Jan. 15, 2002

(54) APPARATUS AND METHOD FOR CONTROLLING OPTICS PROPAGATION BASED ON A TRANSPARENT METAL STACK

(76) Inventors: Michael Scalora, 15037 Ashmont Cir., Huntsville, AL (US) 35803; Mark J. Bloemer, 15829 Sanderson La., Athens, AL (US) 35613; Salvatore Baglio, Via E. Beliu 288, Paterno, CT (US) 95047

(*) Notice: Subject to any disclaimer, the term of this patent is extended or adjusted under 35 U.S.C. 154(b) by 0 days.

(21) Appl. No.: 09/471,035

(22) Filed: Dec. 23, 1999

(51) Int. Cl.[7] .............................................. G02B 26/00
(52) U.S. Cl. ...................................................... 359/290
(58) Field of Search ................................. 359/223, 224, 359/245, 247, 248, 290, 291, 295, 318

(56) References Cited

U.S. PATENT DOCUMENTS

| | | | |
|---|---|---|---|
| 3,410,625 A | 11/1968 | Edwards | 359/359 |
| 3,637,294 A | 1/1972 | Berthold, III | 359/582 |
| 3,682,528 A | 8/1972 | Apfel et al. | 359/360 |
| 3,697,153 A | 10/1972 | Zycha | 359/588 |
| 3,698,946 A | 10/1972 | Kaspaul et al. | 428/432 |
| 3,706,485 A | 12/1972 | Fawcett et al. | 359/588 |
| 3,759,604 A | 9/1973 | Thelen | 359/588 |
| 3,853,386 A | 12/1974 | Ritter et al. | 359/588 |
| 3,885,855 A | 5/1975 | Gross | 359/360 |
| 3,889,026 A | 6/1975 | Groth | 428/34 |
| 3,901,997 A | 8/1975 | Groth | 428/428 |
| 3,914,023 A | 10/1975 | Thelen | 359/588 |
| 3,978,273 A | 8/1976 | Groth | 428/434 |
| 4,179,181 A | 12/1979 | Chang | 359/360 |
| 4,189,205 A | 2/1980 | Vandehei | 359/360 |
| 4,229,066 A | 10/1980 | Rancourt et al. | 359/359 |
| 4,240,696 A | 12/1980 | Tracy et al. | 359/578 |
| 4,269,481 A | 5/1981 | Yeh et al. | 359/259 |
| 4,441,789 A | 4/1984 | Pohlack | 359/588 |
| 4,488,775 A | 12/1984 | Yamamoto | 359/588 |
| 4,525,687 A | 6/1985 | Chemla et al. | 359/276 |
| 4,556,277 A | 12/1985 | Fan et al. | 359/360 |
| 4,590,118 A | 5/1986 | Yatabe et al. | 428/215 |
| H182 H | 1/1987 | Heller | 340/568 |

(List continued on next page.)

FOREIGN PATENT DOCUMENTS

| | | | |
|---|---|---|---|
| DE | 4334578 A1 | 4/1995 | G01J/3/26 |
| EP | 0 12 439 A1 | 12/1979 | G02F/1/21 |
| EP | 0 782 017 A2 | 7/1997 | G02B/6/12 |

(List continued on next page.)

OTHER PUBLICATIONS

Ashcroft, Neil W. and Mermin, N. David, *Solid State Physics*, Holt, Rinehart and Winston, 1976, pp. xi–xii and 765–766.

Assanto, Gaetano, "Quadratic Cascading: Effects and Applications," *Beam Shaping and Control with Nonlinear Optics*, (ed. By Kajzar and Reinisch), Plenum Press, 1998, pp. vii–viii and 341–374.

(List continued on next page.)

*Primary Examiner*—Georgia Epps
*Assistant Examiner*—Gary O'Neill
(74) *Attorney, Agent, or Firm*—Sterne, Kessler, Goldstein & Fox P.L.L.C.

(57) ABSTRACT

A device and method of optics propagation and signal control integrated with micro-electro-mechanical-switches (MEMS). This device modifies optical transmission properties of a transparent multilayer metal stack by mechanically varying the thickness of an air gap between layers in the stack This is accomplished by utilizing MEMS coupled with the stack to change the optical path in a given layer of the transparent multilayer metal stack. This can be accomplished by developing a hybrid combination of transparent multilayer stacks and MEMS, wherein an air gap is used as one of the dielectric layers. The air gap thickness can be controlled by the MEMS device thereby enabling dramatic control of the optical path.

12 Claims, 5 Drawing Sheets

U.S. PATENT DOCUMENTS

| | | | | |
|---|---|---|---|---|
| 4,726,655 | A | 2/1988 | Mahlein | 359/588 |
| 4,756,602 | A | 7/1988 | Southwell et al. | 358/588 |
| 4,770,496 | A | 9/1988 | Mahlein | 359/588 |
| 4,773,717 | A | 9/1988 | Pai et al. | 359/589 |
| 4,838,648 | A | 6/1989 | Phillips et al. | 359/585 |
| 4,846,551 | A | 7/1989 | Rancourt et al. | 359/589 |
| 4,915,494 | A | 4/1990 | Shipley et al. | 359/848 |
| 5,035,485 | A | 7/1991 | Kageyama | 359/586 |
| 5,071,206 | A | 12/1991 | Hood et al. | 359/586 |
| 5,111,329 | A | 5/1992 | Gajewski et al. | 359/275 |
| 5,119,232 | A | 6/1992 | Daley et al. | 359/359 |
| 5,148,504 | A | 9/1992 | Levi et al. | 385/14 |
| 5,170,290 | A | 12/1992 | Land et al. | 359/579 |
| 5,179,468 | A | 1/1993 | Gasloli | 359/359 |
| 5,187,461 | A | 2/1993 | Brommer et al. | 333/219.1 |
| 5,212,584 | A | 5/1993 | Chung | 359/260 |
| 5,225,930 | A | 7/1993 | Land et al. | 359/578 |
| 5,233,464 | A | 8/1993 | Costich | 359/359 |
| 5,239,406 | A | 8/1993 | Lynam | 358/275 |
| 5,247,528 | A | 9/1993 | Shinozaki et al. | 372/22 |
| 5,262,894 | A | 11/1993 | Wheatley et al. | 359/586 |
| 5,268,785 | A | 12/1993 | Crenshaw et al. | 359/244 |
| 5,302,449 | A | 4/1994 | Eby et al. | 428/336 |
| 5,315,430 | A | 5/1994 | Brennan et al. | 359/248 |
| 5,315,437 | A | 5/1994 | Alfano et al. | 359/588 |
| 5,337,183 | A | 8/1994 | Rosenblatt | 359/248 |
| 5,345,328 | A | 9/1994 | Fritz et al. | 359/248 |
| 5,355,245 | A | 10/1994 | Lynam | 359/267 |
| 5,372,874 | A | 12/1994 | Dickey et al. | 428/216 |
| 5,406,573 | A | 4/1995 | Ozbay et al. | 372/43 |
| 5,424,559 | A | 6/1995 | Kasahara | 257/21 |
| 5,433,988 | A | 7/1995 | Fukuda et al. | 428/141 |
| 5,440,421 | A | 8/1995 | Fan et al. | 359/245 |
| 5,448,404 | A | 9/1995 | Schrenk et al. | 358/584 |
| 5,457,570 | A | 10/1995 | Lu et al. | 359/361 |
| 5,471,180 | A | 11/1995 | Brommer et al. | 333/202 |
| 5,480,722 | A | 1/1996 | Tomonaga et al. | 428/428 |
| 5,493,442 | A | 2/1996 | Buchholz et al. | 359/359 |
| 5,506,017 | A | 4/1996 | Termath | 428/216 |
| 5,506,919 | A * | 4/1996 | Roberts | 385/1 |
| 5,513,039 | A | 4/1996 | Lu et al. | 359/584 |
| 5,514,476 | A | 5/1996 | Hartig et al. | 428/426 |
| 5,550,373 | A | 8/1996 | Cole et al. | 250/338.1 |
| 5,552,882 | A | 9/1996 | Lyons et al. | 356/73.1 |
| 5,557,462 | A | 9/1996 | Hartig et al. | 359/585 |
| 5,559,825 | A | 9/1996 | Scalora et al. | 372/96 |
| 5,563,734 | A | 10/1996 | Wolfe et al. | 359/360 |
| 5,591,529 | A | 1/1997 | Braatz et al. | 428/457 |
| 5,595,825 | A | 1/1997 | Guiselin | 428/428 |
| 5,615,289 | A | 3/1997 | Duck et al. | 385/24 |
| 5,740,287 | A | 4/1998 | Scalora et al. | 385/6 |
| 5,751,466 | A | 5/1998 | Dowling et al. | 359/248 |
| 5,796,902 | A | 8/1998 | Bhat et al. | 385/122 |
| 5,801,378 | A | 9/1998 | Hane et al. | 250/237 |
| 5,907,427 | A | 5/1999 | Scalora et al. | 359/248 |
| 5,909,035 | A | 6/1999 | Kim | 257/59 |
| 5,909,280 | A | 6/1999 | Zavracky | 356/352 |
| 5,914,804 | A | 6/1999 | Goossen | 359/291 |
| 5,920,391 | A | 7/1999 | Grasdepot et al. | 356/352 |
| 5,943,155 | A * | 8/1999 | Goossen | 359/247 |
| 5,949,571 | A * | 9/1999 | Goossen | 359/291 |
| 6,028,693 | A | 2/2000 | Fork et al. | 359/248 |
| 6,031,653 | A | 2/2000 | Wang | 359/247 |

FOREIGN PATENT DOCUMENTS

| | | | | |
|---|---|---|---|---|
| EP | 0 782 017 A3 | 8/1998 | | G02B/6/12 |
| EP | 0930481 A2 | 7/1999 | | G01B/9/02 |
| GB | 1406940 | 9/1975 | | G02B/1/10 |
| JP | 59-151108 | 8/1984 | | G02B/5/20 |
| JP | 64-80908 | 3/1989 | | G02B/5/28 |
| JP | 2-187732 | 7/1990 | | G02F/1/23 |
| WO | WO 93/09422 | 5/1993 | | G01N/21/35 |
| WO | WO 96/11516 | 4/1996 | | H01S/3/085 |

OTHER PUBLICATIONS

Ball, G.A. and Morey, W.W., "Continuously tunable single–mode erbium fiber laser," *Optics Letters*, Optical Society of America, vol. 17, No. 6, Mar. 15, 1992, pp. 420–422.

Bendickson, J.M. et al., "Analytic expressions for the electromagnetic mode density in finite, one–dimensional, photonic band–gap structures," *Physical Review E*, The American Physical Society, vol. 53, No. 4–B, Apr. 1996, pp. 4107–4121.

Bloemer, M.J. and Scalora, M., "Transmissive properties of $AG/MgF_2$ photonic band gaps," *Applied Physics Letters*, Institute of Physics, vol. 72, No. 14, Apr. 6, 1998, pp. 1676–1678.

Bouché, N. et al., "Dynamics of gain in vertical cavity lasers and amplifiers at 1.53 $\mu$m using femtosecond photoexcitation," *Applied Physics Letters*, American Institute of Physics, vol. 73, No. 19, Nov. 9, 1998, pp. 2718–2720.

Centini, M. et al., "Dispersive properties of finite, one–dimensional photonic band gap structures: Applications to nonlinear quadratic interaction", *Physical Review E*, The American Physical Society, vol. 60, No. 4–B, Oct. 1999, pp. 4891–4898.

Cojocaru, C. et al. "Active reflection via a phase–insensitive quadratic nonlinear interaction within a microcavity,"*Applied Physics Letters*, American Institute of Physics, vol. 74, No. 4, Jan. 25, 1999, pp. 504–506.

D'Aguanno. G. D. et al., "Enhancement of $\chi^{(2)}$ cascading processes in one–dimensional photonic bandgap structures," *Optics Letters*, Optical Society of America, vol. 24, No. 23, Dec. 1, 1999, pp. 1663–1665.

DeSalvo, R. et al., "Self–focusing and self–defocusing by cascaded second–order effects in KTP," *Optics Letters*, Optical Society of America, vol. 17, No. 1, Jan. 1, 1992, pp. 28–30.

Dialog File 348 (European Patents) English Language Patent Abstract for EP 0 012 439 A1, published Jun. 25, 1990, p. 1.

Dialog File 347 (JPO & JAPIO) English Language Patent Abstract for JP 59–151108, published Aug. 29, 1984, p. 1.

Dowling J.P. et al., "The photonic band edge laser: A new approach to gain enhancement," *Journal of Applied Physics*, American Institute of Physics, vol. 75, No. 4, Feb. 15, 1994, pp. 1896–1899.

Fowles, Grant R., *Introduction to Modern Optics*, Second Edition, 1975, Holt, Rhinehart and Winston, pp. v–viii, 33–38, 52–55 and 96–103.

Gré, M.–A. et al., "Electrostatic Polysilicon Microrelays Integrated with MOSFETs" *Proceedings of Micro Electro Mechanical Systems*, IEEE, Jan. 25–28, 1994, pp. 97–101.

Haus, J.W. et al., "Enhanced second–harmonic generation in media with a weak periodicity," *Physical Review A*, The American Physical Society, vol. 57, No. 3, Mar. 1988, pp. 2120–2128.

"Indicators and displays," Machine Design: 1988 Reference Issue Series, Penton Publishing Inc., May 19, 1988, pp. 190–200.

Joannopoulos, John D. et al., Photonic Crystals: Molding the Flow of Light, 1995, Princeton Universtiy Press, (copy of entire book provided).

Lewis, C.F., "Optical Coatings: More Than Meets the Eye," *Materials Engineering*, Penton Publishing, Inc. Nov. 1989, pp. 29–32.

Macleod, H.A., *Thin–Film Optical Filters*, Second Edition, 1986, Macmillan Publishing Company, (copy of entire book provided).

Marion, Jerry B. *Classical Electromagnetic Radiation*, 1965, Academic Press Inc., pp. ix–xv, 148–152, 170–177.

Martorell J. et al. "Pseudo–metal Reflection at the interface between a linear and a nonlinear material,"*Optics Communications*, Elsevier Science B.V., vol. 144, Nos 1–3, Dec. 1, 1997, pp. 65–69.

Mooney, T.A., "Which Coating Process Should I Choose?," *Lasers & Optronics*, Jul. 1988, pp. 39–44.

Pasachoff, Jay M. and Kutner, Marc L., *University Astronomy*, 1978, W.B. Saunders Company, pp. ix–xvii and 177–239.

Patent Abstracts of Japan, vol. 018, No. 095 (E–1509), JP 05 299751 A, published Nov. 12, 1993.

Patent Abstracts of Japan, vol. 014, No. 468 (P–1115), JP 2187732, published Jul. 23, 1990.

Patent Abstracts of Japan, vol. 008, No. 081 (E–238), JP 59 000977 A, published Jan. 6, 1984.

Petersen K.E., "Micromechanical Membrane Switches in Silicon,"*IBM J. Res. Develop.*, vol. 23, No. 4, Jul. 1979, pp. 376–385.

Rao, Y.J. et al., "Spatially–multiplexed fiber –optic Bragg grating strain and temperature sensor system based on interferometic wavelength–shift detection," *Electronics Letters*, The Institution of Electrical Engineers, vol. 31, No. 12, Jun. 8, 1995, pp. 1009–1010.

Scalora , M. and Crenshaw, M.E., "A beam Progagation method that handles reflections," *Optics Communications*, Elsevier Science B.V., vol. 108, Nos. 4–6, Jun. 1, 1994, pp. 191–196.

Scalora M. et al., "Dipole emission rates in one dimensional photonic band–gap materials,"*Applied Physics B*, Supplement of vol. B 60, No. 2/3, 1995, Springer–Verlag, pp. S57–S61.

Scalora, M. et al., "Optical Limiting and Switching of Ultrashort Pulse in Nonlinear Photonic Band–Gap Materials,"*Physical Review Letters*, The American Physical Society, vol. 73, No. 10, Sep. 5, 1994, pp. 1368–1371.

Scalora, M. et al., "The photonic band–edge optical diode," *Journal of Applied Physics*, American Institute of Physics, vol. 76, No. 4, Aug. 15, 1994, pp. 2023–2026.

Scalora, M. et al., "Pulse progagation near highly reflective surfaces: applications to photonic band–gap structures and the question of superluminal tunneling times," *Physical Review A.*, The American Physical Society, The American Physical Society, vol. 52, No. 1, Jul. 1995, pp. 726–734.

Scalora, M. et al., "Pulsed second–harmonic generation in non–linear, one–dimensional, periodic structures," *Physical Review A*, The American Physical Society, vol. 56, No. 4, Oct. 1997, pp. 3166–3174.

Scalora, M. et al., "Ultrashort pulse Progagation at the photonic band edge: large tunable group delay with minimal distortion and loss," *Physical Review E*, The American Physical Society, vol. 54, No. 2, August 1996, pp. R1078–R1081.

Sprung, D.W.L. et al., "Scattering by a finite periodic potential," *American Journal of Physics*, American Association of Physics Teachers, vol. 61, No. 12, Dec. 1993, pp. 1118–1124.

Sze, S.M., *Physics of Semiconductor Devices*, Second Edition, 1981, John Wiley & Sons, pp. ix–xii and 681–742.

Sze, S.M., *Semiconductor Devices: Physics & Technology*, 1985, John Wiley & Sons, pp. ix–xi and 252–467.

Tocci, M.D. et al., "Thin–film nonlinear optical diode," *Applied Physics Letters, American Institute of Physics*, vol. 66, No. 18, May 1, 1995, pp. 2324–2326.

Ward, A.J. et al., "Photonic dispersion surfaces,"*Journal of Physics: Condensed Matter*, IOP Publishing Ltd., vol. 7, No. 10, Mar. 6,1995, pp. 2217–2224.

Yao, J.J. et al., "A Surface Micromachined Miniature Switch for Telecommunications Applications with Signal Frequencies from DC up to 4 Ghz," *Transducer '95*, Foundation for Sensor and Actuator Technology, 1995, pp. 384–387.

Yariv, Amnon and Yeh, Pochi, Optical Waves in Crystals: Propagation and Control of Laser Radiation, 1984, John Wiley & Sons, pp. vii–xi and 439–447.

Akhmediev, N. et al., "Stability analysis of even and odd waves of symmetric nonlinear planar optical waveguides," *J. Opt. Soc. Am. B*, Optical Society of America, vol. 10, No. 2, Feb. 1993, pp. 230–236.

Bowden, C.M. et al., "Development and Applications of Materials Exhibiting Photonic Band Gaps," *J. Opt. Soc. Am. B*, Optical Society of America, vol. 10, No. 2, Feb. 1993, pp. 279–280.

Brown, E.R. et al., "Radiation properties of a planar antenna on a photonic–crystal substrate," *J. Opt. Soc. Am. B*, Optical Society of America, vol. 10, No. 2, Feb. 1993, pp. 404–407.

Bullock, D.L. et al., "Photonic band structure investigation of two–dimensional Bragg reflector mirrors for semiconductor laser mode control," *J. Opt. Soc. Am. B*, Optical Society of America, vol. 10, No. 2, Feb. 1993, pp. 399–403.

Chernov, V.E. and B.A. Zon, "Depolarization of laser radiation in a nonlinear medium," *J. Opt. Soc. Am. B*, Optical Society of America, vol. 10, No. 2, Feb. 1993, pp. 210–212.

Chu, D.Y. and S.–T. Ho, "Spontaneous emission from excitons in cylindrical dielectric waveguides and the spontaneous–emission factor of microcavity ring lasers," *J. Opt. Soc. Am. B*, Optical Society of America, vol. 10, No. 2, Feb. 1993, pp. 381–390.

Crook, R.J. et al., "Long–range optical modes supported by a strongly absorbing thin organic film," *J. Opt. Soc. Am. B*, Optical Society of America, vol. 10, No. 2, Feb. 1993, pp. 237–243.

De Martini F. et al., "Spontaneous and stimulated emission in the thresholdess microlaser," *J. Opt. Soc. Am. B*, Optical Society of America, vol. 10, No. 2, Feb. 1993, pp. 360–380.

Dowling, J.P. and C.M. Bowden, "Beat radiation from dipoles near a photonic band edge," *J. Opt Soc. Am. B*, Optical Society of America, vol. 10, No. 2, Feb. 1993, pp. 353–355.

Dutta, B. et al., "Squeezed states, photon–number distributions, and U(1) invariance," *J. Opt. Soc. Am. B*, Optical Society of America, vol. 10, No. 2, Feb. 1993, pp. 253–264.

Erdogan, T. et al., "Enhancement and inhibition of radiation in cylindrically symmetric, periodic structures," *J. Opt. Soc. Am. B*, Optical Society of America, vol. 10, No. 2, Feb. 1993, pp. 391–398.

Gaylord, T.K. et al., "Application of electromagnetics formalism to quantum–mechanical electron–wave propagation in semiconductors," *J. Opt. Soc. Am. B*, Optical Society of America, vol. 10, No. 2, Feb. 1993, pp. 333–339.

Genack, A.Z. and N. Garcia, "Electromagnetic localization and photonics," *J. Opt. Soc. Am. B*, Optical Society of America, vol. 10 , No. 2 , Feb. 1993, pp. 408–413.

Helmfrid, S. et al., "Influence of various imperfections on the conversion efficiency of second–harmonic generation in quasi–phase matching lithium niobate waveguides,"*J. Opt. Soc. Am. B*, Optical Society of America, vol. 10, No. 2, Feb. 1993, pp. 222–229.

Kilin, S.Ya. and I.I. Fedchenia, "Statistics of random spikes in the intensity of stimulated Raman scattering: intitation by spatially distributed fluctuation,"*J. Opt. Soc. Am. B*, Optical Society of America, vol. 10, No. 2, Feb. 1993, pp. 199–209.

Kurizki, G. et al., "Quantum electrodynamics in photonic band gaps: atomic–beam interaction with a defect mode," *J. Opt. Soc. Am. B*, Optical Socity of America, vol. 10, No. 2 Feb. 1993, pp. 346–352.

Leoński, W., "Squeezed–state effect on bound–continuum transitions," *J. Opt. Soc. Am. B*, Optical Society of America, vol. 10, No. 2, Feb. 1993, pp. 244–252.

Leung, K.M., "Defect modes on photonic band structures: a Green's function approach using vector Wannier functions," *J. Opt. Soc. Am. B*, Optical Society of America, vol. 10, No. 2, Feb. 1993, pp. 303–306.

Maradudin, A.A. and A.R. McGurn, "Photonic band structure of a truncated, two–dimensional, periodic dielectric medium," *J. Opt. Soc. Am. B*, Optical Society of America, vol. 10, No. 2, Feb. 1993, pp. 307–313.

Meade, R.D. et al.. "Nature of the photonic band gap: some insights from a field analysis," *J. Opt. Soc. Am. B*Optical Society of America, vol. 10, No. 2. Feb. 1993, pp. 328–332.

Montemezzani, G. et al., "Photorefractive charge compensation at elevated temperatures and application to $KNbO_3$," *J. Opt. Soc. Am. B*, Optical Society of American, vol. 10, No. 2, Feb. 1993, pp. 171–185.

Mossberg, T.W.and M. Lewenstein, "Radiative properties of strongly driven atoms in the presene of photonic bands and gaps," *J. Opt. Soc. Am. B*, Optical Society of America, vol. 10, No. 2, Feb. 1993, pp. 340–345.

Robertson, W.M. et al., "Measurement of the photon dispersion relation in two–dimensional ordered dielectric arrays," *J. Opt. Soc. Am. B*, Optical Society of American, vol. 10, No. , Feb. 1993, pp. 322–327.

Smith, D.R. et al., "Photonic band structure and defects in one and two dimensions," *J. Opt. Soc. Am. B*, Optical Society of America, vol. 10, No. 2, Feb. 1993, pp. 314–321.

Söziier, H. Sami and J. W. Haus, "Photonic bands: simple–cubic lattice," *J. Opt. Soc. Am. B*, Optical Socity of America, vol. 10, No. 2, Feb. 1993, pp. 296–302.

Sugawara, T. et al., "Instabilty in a $CO_2$ sequence–band laser with a saturable absorber and vibration–to–vibration energy transfer processes," *J. Opt. Soc. Am. B*, Optical Society of America, vol. 10, No. 2, Feb. 1993, pp. 265–270.

Tong, B.Y. et al. "Fluoresence–lifetime measurements in monodispersed suspension of polystyrene particles," *J. Opt. Soc. Am. B*, Optical Society of America, vol. 10, No. 2, Feb. 1993, pp. 356–359.

Wijekoon, W.M.K.P. et al., "Second–harmonic generation studies of difference in molecular orientation of Langmuir –Blodgett films fabricated by vertical and horizontal dipping techniques," *J. Opt. Soc. Am. B*, Optical Society of America, vol. 10, No. 2, Feb. 1993, pp. 213–221.

Yablanovich, E., "Photonic band–gap structures," *J. Opt. Soc.. Am. B*, Optical Society of America, vol. 10, No. 2, Feb. 1993, pp. 283–295.

Zahavi, O. et al., "Study of amplified spontaneous emission systems by the ray–tracing technique," *J. Opt. Soc. Am. B*, Optical Society of America, vol. 10, No. 2, Feb. 1993, pp. 271–278.

Ziolkowski, R.W. and J.B. Judkins, "Full–wave vector Maxwell equation modeling of the self–focusing of ultrashort optical pulses in a nonlinear Kerr medium exhibiting a finite response time," *J. Opt. Am. B.*, Optical Society of America, vol. 10, No. 2, Feb. 1993, pp. 186–198.

Copy of International Search Report, Application No. PCT/US00/34763, Issued Jul. 20, 2001, 7 pages.

* cited by examiner

FIG. 2A
TRANSPARENT METAL-MEMS OPTICAL LIMITER
FIG. 2B
TRANSPARENT METAL-MEMS OPTICAL LIMITER
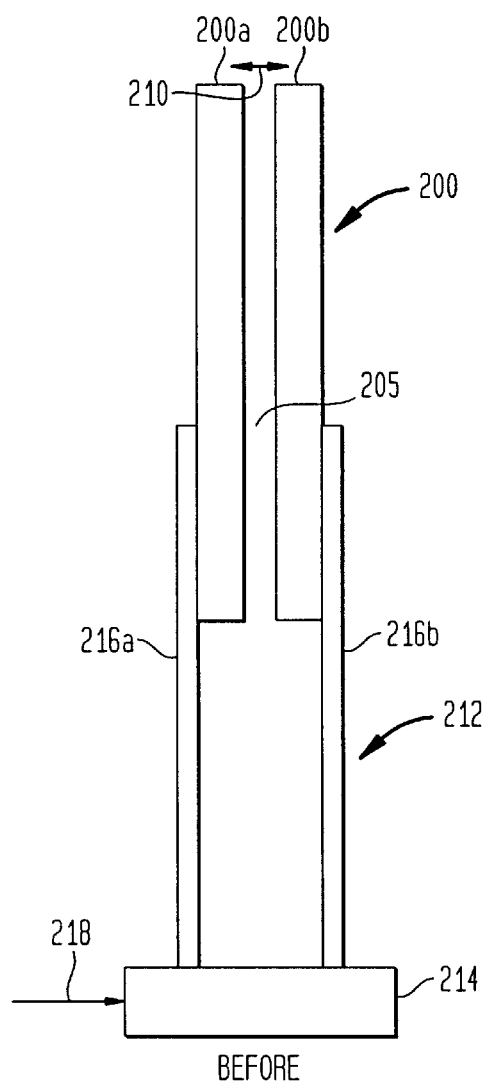
BEFORE
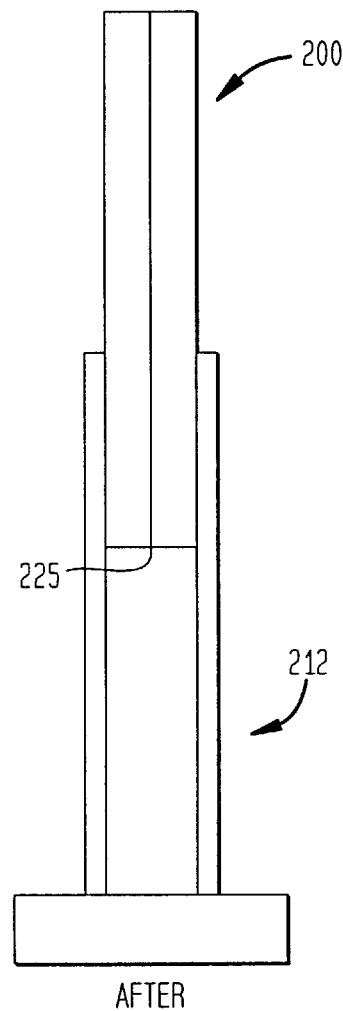
AFTER

APPARATUS AND METHOD FOR CONTROLLING OPTICS PROPAGATION BASED ON A TRANSPARENT METAL STACK

CROSS REFERENCE TO RELATED APPLICATIONS

This patent application is related to the following applications:

1. "Photonic Bandgap Apparatus and Method for Delaying Photonic Signals," Ser. No. 08/584,403, now U.S. Pat. No. 5,751,466 by J. Dowling, M. Scalora, M. Bloemer, M. Tocci, C. Bowden, R. Fork, S. Reinhardt, and R. Flynn, filed on Jan. 11, 1996, now pending and incorporated in its entirety herein by reference;
2. "Photonic Signal Frequency Conversion Using a Photonic Band Gap Structure," Ser. No. 09/382,690, by Scalora et al, filed on Aug. 25, 1999, now pending, which is a continuation of International Application PACT/US98/06378, with an international filing date of Apr. 2, 1998, now pending and incorporated in its entirety herein by reference;
3. "Photonic Band Gap Device and Method Using a Periodicity Defect Region to Increase Photonic Signal Delay," Ser. No. 09/250,283, by M. Scalora et al, filed on Feb. 16, 1999, now pending and incorporated in its entirety herein by reference;
4. "Photonic Band Gap Device and Method Using a Periodicity Defect Region Doped with a Gain Medium to Increase Photonic Signal Delay," Ser. No. 60/134,536, by M. Scalora, filed on May 17, 1999, now pending and incorporated in its entirety herein by reference;
5. "Efficient Non-linear Phase Shifting Using a Photonic Band Gap Structure," Ser. No. 60/156,961, by G. D'Aguanno, filed on Sep. 30, 1999, now pending and incorporated in its entirety herein by reference; and
6. "Photonic Signal Reflectivity and Transmissivity Control Using a Photonic Band Gap Structure" Ser. No. 09/471,036, G. D'Aguanno, M. Centini, C. Sibilia, M. Scalora and M. Bloemer, filed concurrently herewith, and incorporated in its entirety herein by reference.

FEDERALLY SPONSORED RESEARCH AND DEVELOPMENT

This invention was made with Government support under Contract DAAH01-96-R234 awarded by the U.S. Army Missile Command. The Government has certain rights in the invention.

BACKGROUND OF THE INVENTION

1. Field of the Invention

The present invention relates to transparent metal stacks.

2. Related Art

Micro-electro-mechanical-switches (MEMS) have been used in such applications as pressure sensors, accelerometers, and nozzles, and have been proposed for use in radio frequency (RF) telecommunications systems. In particular, a number of different types of MEMS switches have been developed. Petersen, K. "Micromechanical Membrane Switches on Silicon," IBM J. Res. Develop., vol. 23, 1979, pp. 376–385 describes a chemical etching process for fabricating a mechanical switch, which is sensitive to vibrations and has poor insertion loss and isolation. Gretillat et al, "Electrostatic Polysilicon Microrelays Integrated with MOSFETs," in proceedings of Micro Electro Mechanical Systems Workshop, 1994, pp. 97–101 describes a switch for use in an automated testing applications. The switch exhibits large insertion loss and high frequency capacitive coupling to its polysilicon cantilever arm in its off-state. Yao et al. "A Surface Micromachined Minature Switch for Telecommunications Applications with Signal Frequencies from DC up to 4 GHz" In Tech. Digest, Transducer-95, Stockholm, Sweden, Jun. 25–29, 1995, pp. 384–387 describes a switch for use in RF telecommunications that uses electrostatic actuation to control a silicon dioxide cantilever arm to open and close a signal line, and has an electrical isolation of −50 dB and an insertion loss of 0.1 dB at 4 GHz. These three documents are incorporated in their entireties herein by reference.

The fields of communications and data processing are currently transitioning from using electrical signals to using optical signals. As a result, there is an increased need for optical devices that perform various tasks in the control of these optical signals. Such devices include tunable filters and optical limiters.

One method of creating a low distortion, controllable photonic delay is through the use of photonic band gap (PBG) structures. Uniform PBG structures typically comprise a stack of alternating layers of refractive materials of similar thicknesses, such as gallium arsenide and aluminum arsenide, which exhibit photonic band gaps in their transmission spectra. These alternating layers have different indices of refraction and can be deposited by well known deposition techniques onto a substrate.

By sending a photonic signal of a given frequency ($\omega$) through a uniform PGB device, the discontinuity of the indices of refraction imparts a delay to the photonic signal. These devices slow down the photonic signal as a result of scattering inside the uniform PBG structure. Since the photonic delay is proportional to the square of the number of periods contained in the uniform PBG structure, a device can be constructed that imparts a predetermined delay to a photonic signal. The physical processes involved in the photonic signal delay imparted by a uniform PBG structure are described in detail in Scalora, et al., "Ultrashort pulse propagation at the photonic band edge: large tunable group delay with minimal distortion and loss," Phys. Rev. E Rapid Comm. 54(2), R1078–R1081 (August 1996), which is incorporated by reference herein in its entirety.

With the above methodology, an external electric field is applied in order to shift the location of the transmission resonance inside a photonic band gap device to induce changes in the velocity of an externally injected pulse of light. By varying the strength of the applied field, a method by which the index of refraction of the affected material layer can be changed. Changing the refractive index of the layer causes the desired change in the velocity of the incident light beam.

However, the index of refraction of most ordinary materials can be changed only slightly with the utilization of externally applied electric fields. For example, the index of refraction of GaAs can be changed by approximately one part in 1000 if an ordinary electric field is applied across the 100-nm layer discussed above. That is, a shift in the index of refraction occurs from 3.4 to 3.401. While this shift can be considered meaningful, experimentally observable, and useful for some applications like an optical delay line, this shift is too small and impractical for many other applications of interest. As an example, this change in index of refraction from 3.4 to 3.401 can shift the transmission resonance in a photonic band gap structure by approximately 0.5 nm. While this shift may be adequate for control of the velocity of an optical pulse, it is completely inadequate for device applications such as optical limiters and tunable filters wherein device requirements can be very demanding. For example, an optical limiter must stop a coherent signal regardless of its wavelength. This means it must distinguish between low intensity light levels, such as those of ambient light, and a high intensity coherent light, such as a laser beam. In addition, the device must be able to discriminate between different colors of the incident light, coherent or not, over the entire visible range. That is, it must have a dynamic range approximately 1000 times greater than the shift discussed in our previous patent application and incorporated by reference herein in its entirety, i.e., from 0.5 nm to approximately 500 nm or more.

Hence, there is a need for a device and method to change the index of refraction by greater than a factor of 2 in a number of readily available materials.

SUMMARY OF THE INVENTION

The present invention generally relates to a device and method of optics propagation and signal control integrated with micro-electro-mechanical-switches (MEMS). In particular, the present invention relates to modifying optical transmission properties of a transparent, multilayer metal stack by mechanically varying the thickness of an air gap between layers in the stack. This is accomplished with the novel approach of utilizing MEMS coupled with the stack to change the index of refraction in a given layer of the transparent multilayer metal stack.

According to one embodiment of the present invention, this is accomplished by developing a hybrid combination of transparent multilayer stacks and MEMS, wherein an air gap is used as one of the dielectric layers. The air gap thickness can be controlled by the MEMS device thereby enabling much greater control of the index of refraction.

Further features and advantages of the present invention, as well as the structure and operation of various embodiments of the present invention, are described in detail below with reference to the accompanying drawings.

BRIEF DESCRIPTION OF THE FIGURES

The present invention is described with reference to the accompanying drawings. In the drawings, like reference numbers indicate identical or functionally similar elements.

FIG. 2A is a representation of a transparent metal stack of the present invention including the novel air gap as one layer and in the open position.

FIG. 2B is a representation of a transparent metal stack of the present invention including the novel air gap as one layer and in the closed position.

DETAILED DESCRIPTION OF THE PREFERRED EMBODIMENTS

Figure 1A:
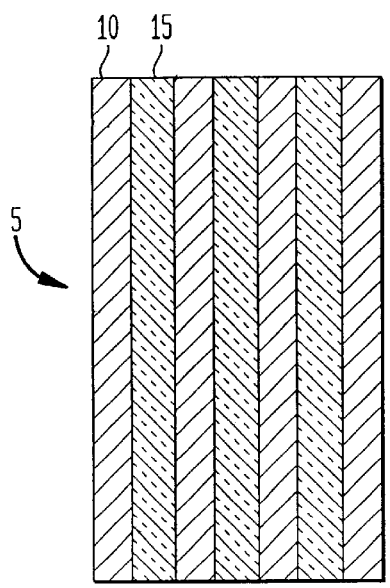
FIG. 1A is a representation of a transparent metal stack.
Figure 1B:
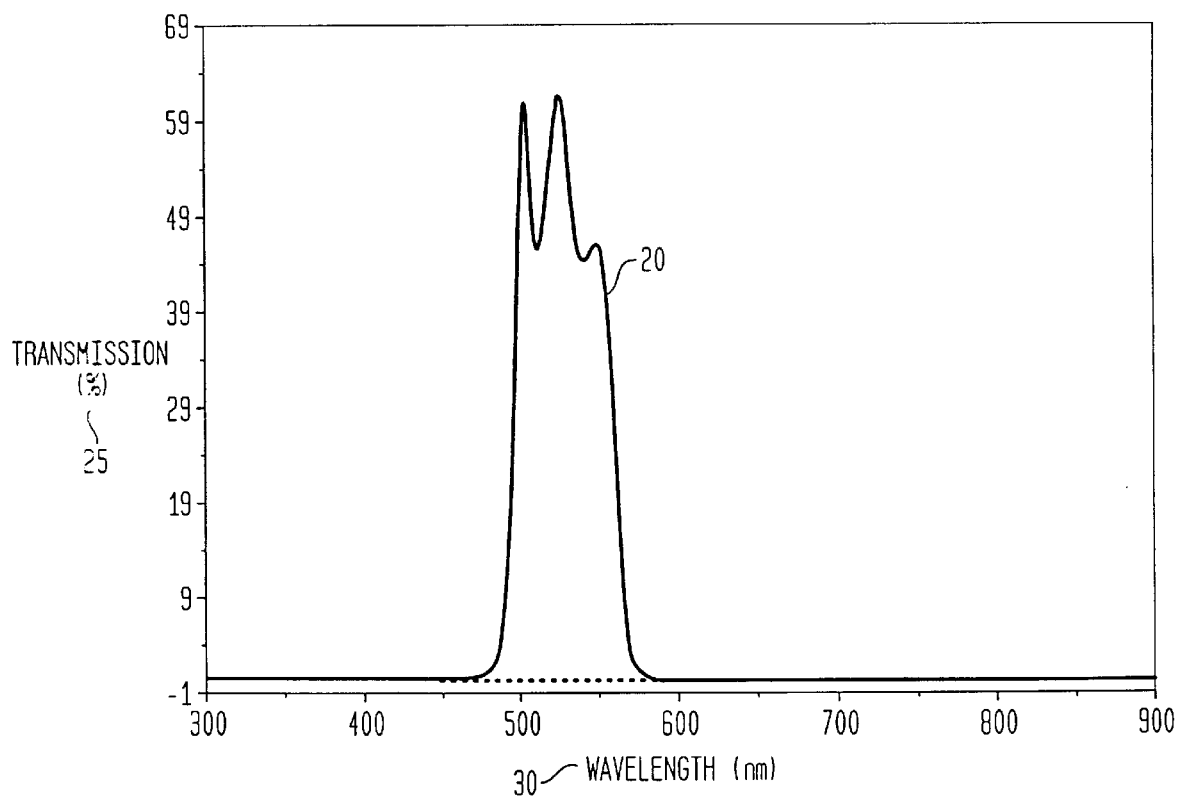
FIG. 1B is a chart of the transmission function of the transparent metal stack of FIG. 1A.

An example of a transparent metal stack 5 is shown in FIG. 1A, and the transmission function 20 thereof is shown in FIG. 1B. Stack 5 consists of alternating layers of silver and any material whose initial refractive index is approximately 1.37, with thickness 140 nm. The corresponding transmission function 20 is represented as a solid-line of FIG. 1B: the structure is transparent to wavelengths that fall in the visible range.

An optical path is a quantity that is defined in terms of the index of refraction and the physical thickness of any material. More precisely, the optical path D is the product of the index of refraction and the physical thickness (or absolute thickness) of the material, i.e., D=nL. For example, the index of refraction of GaAs is n=3.4 at a wavelength $\lambda$=1.5 microns. The optical path of a 100-nm thick GaAs layer (L=100 nm) is D=340 nm at a wavelength of 1.5 microns. Therefore changing the index of refraction in a given layer is equivalent to modifying the optical path of that layer.

Assuming that one can apply an external excitation to the dielectric layers such that the effective path of each layer now become approximately 50 nm, then the transmission function changes. The changed transmission function is depicted by the dashed line in FIG. 1B. The device is now opaque to ALL radiation, from ultraviolet to microwave fields. This kind of operation can best be described as optical limiting. That is, the device can react to a perceived threat, which might be in the form of a laser or microwave field, by completely shutting itself down and not allowing the propagation of any radiation. Unfortunately it is difficult to find materials that respond in the manner described above, by changing their index of refraction by a factor of 2 via the application of a magnetic field, for example.

Referring again to FIG. 1A, metal stack 5 comprising alternating layers of a metal 10, such as silver, and any dielectric material 15 whose initial refractive index is approximately 1.37, with thickness 140 nm. It is understood that the measurements herein are used for illustration and other thickness' can be used if in the appropriate proportion. The transmission function waveform 20 is shown in FIG. 1B, wherein it is shown that the structure is transparent to wavelengths that fall in the visible range. The Y-Axis 25 depicts the transmission level and the X-axis 30 depicts the wavelength in nanometers.

Micro-electro-mechanical-switches, or MEMS, can be a potential alternative to nonlinear optical devices. In nonlinear optics, as described in the patent applications incorporated above by reference, a high intensity beam in the form of an electric field, a magnetic field, or both, is used in order to change the physical properties of an ordinary dielectric material. By physical properties, we generally mean the index of refraction of the material, which could be a type of glass for example, or a semiconductor like Gallium Arsenide (GaAs).

In the present application we describe a device based on a hybrid combination of transparent metal multilayer stacks and MEMS that will perform approximately as outlined above. The device limits the transmission of high intensity light and will have a dynamic range on the order of 100 nm or more.

An example device is described below with reference to FIGS. 2A and 2B. With reference to FIG. 2A, a transparent metal stack 200 includes a left stack region 200a and a right stack region 200b separated by a dielectric air gap layer 205. Air has a refractive index equal to 1. The important parameter here is the optical path of the air gap, which can be made to be equivalent to the optical path of the other dielectric layers by controlling its thickness 210.

To this end, a micro-electro-mechanical-switch assembly 212 controls the thickness 210 of air gap layer 205 by displacing left and right stack regions 200a and 200b toward or away from each other. MEMS assembly 212 includes an actuator unit 214 coupled with a left arm 216a and a right arm 216b. Left and right arms 216a and 216b are in respective contact with left and right stack regions 200a and 200b. Actuator unit 214 displaces arms 216a and 216b, and as a result, left and right stack regions 200a and 200b, toward and away from each other, in response to a control signal 218 applied to actuator unit 214, to thereby control thickness 210 of air gap layer 205.

FIG. 2A represents a device arrangement wherein MEMS assembly 212 has established an air gap thickness 210. On the other hand, FIG. 2B represents a device arrangement wherein MEMS assembly 212 has established an air gap thickness of approximately zero by bringing left and right stack regions 200a and 200b together from their separated positions in FIG. 2A.

The results below are of a mathematical model that describes light propagation inside the multilayer stack. It is assumed the stack comprises the following arrangement of materials:

Glass Substrate

| | |
|---|---|
| Ag | 20.00 mn |
| MgF2 | 150.0 |
| Ag | 25.00 |
| MgF2 | 149.80 |
| Ag | 60.00 |
| MgF2 | 25.00 |

Air Layer 205 of variable width 210:

| | |
|---|---|
| MgF2 | 25.00 nm |
| Ag | 60.00 |
| MgF2 | 150.00 |
| Ag | 25.00 |
| MgF2 | 150.00 |
| Ag | 20.00 |

Glass Substrate

Figure 3:
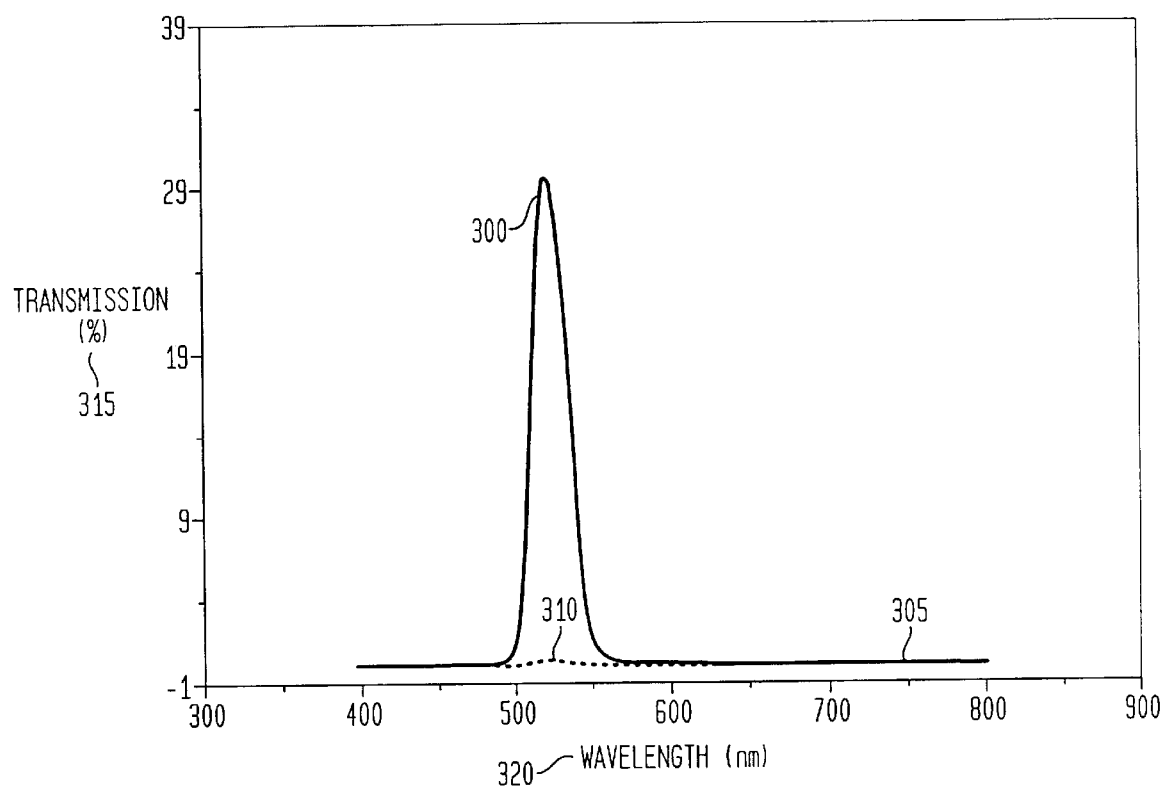
FIG. 3 is a chart of the transmission function (depicted as a solid curved line) of the device arrangement of FIG. 2A, and a chart of the transmission function (depicted as a dashed line) of the device arrangement of FIG. 2B.

The respective transmission functions of the example device corresponding to the arrangements of FIGS. 2A and 2B are schematically represented in FIG. 3 by a solid line curve (for FIG. 2A) and a dashed line curve (for FIG. 2B), wherein the transmission percentage light propagation 315 is represented by the Y-axis and the wavelength is represented by the X-axis 320.

When the width of the air gap 210 depicted in FIG. 2A is approximately 150 nm, the device allows nearly 30% of the incident light to be transmitted in the visible range as shown at transmission peak 300 of FIG. 3. All other radiation over the entire spectrum is reflected or slightly absorbed as represented by a transmission low level 305 of FIG. 3. On the other hand, if the air gap width is reduced to approximately zero, as shown at 220 in FIG. 2B, we have a continuous layer of MgF2 50 nm wide in the center 225 of the structure. From the optical point of view, this layer spoils the resonance tunneling phenomenon which otherwise allows the propagation of the visible wavelengths. This absence of propagation is illustrated as the dashed line 310 of FIG. 3. If the thickness of this central layer falls below a certain value, it ceases to be effective, and could in principle be removed. However, when the stacks are separated, the thin MgF2 layers serve as protective layers for the outer silver layer. Therefore, when the two sides are touching or nearly touching, as shown in FIG. 2B, the calculation shows that the transmission through the stack is reduced to approximately 0.3%, or approximately a factor of 100 less compared to the "open" state, as shown in FIG. 2A.

Using this approach, therefore, it becomes possible to replace nonlinear optical interactions with ordinary oscillations or motions of mechanical systems. A 60% change in the optical path of the air gap layer (or any other layer within the structure as long as it is possible to change its optical path by a large amount) allows a drastic change of the transmissive properties of the device, as shown in FIG. 3. For example, and not by way of limitation, the device depicted in FIGS. 2A and 2B can be an optical limiter, which allows light to be transmitted in the open position, and which rejects most of the light in the closed position. An example dielectric material that was used is MgF2. However, other dielectric materials, such as Silicon Nitride, or Titanium Dioxide can be used.

Figure 4:
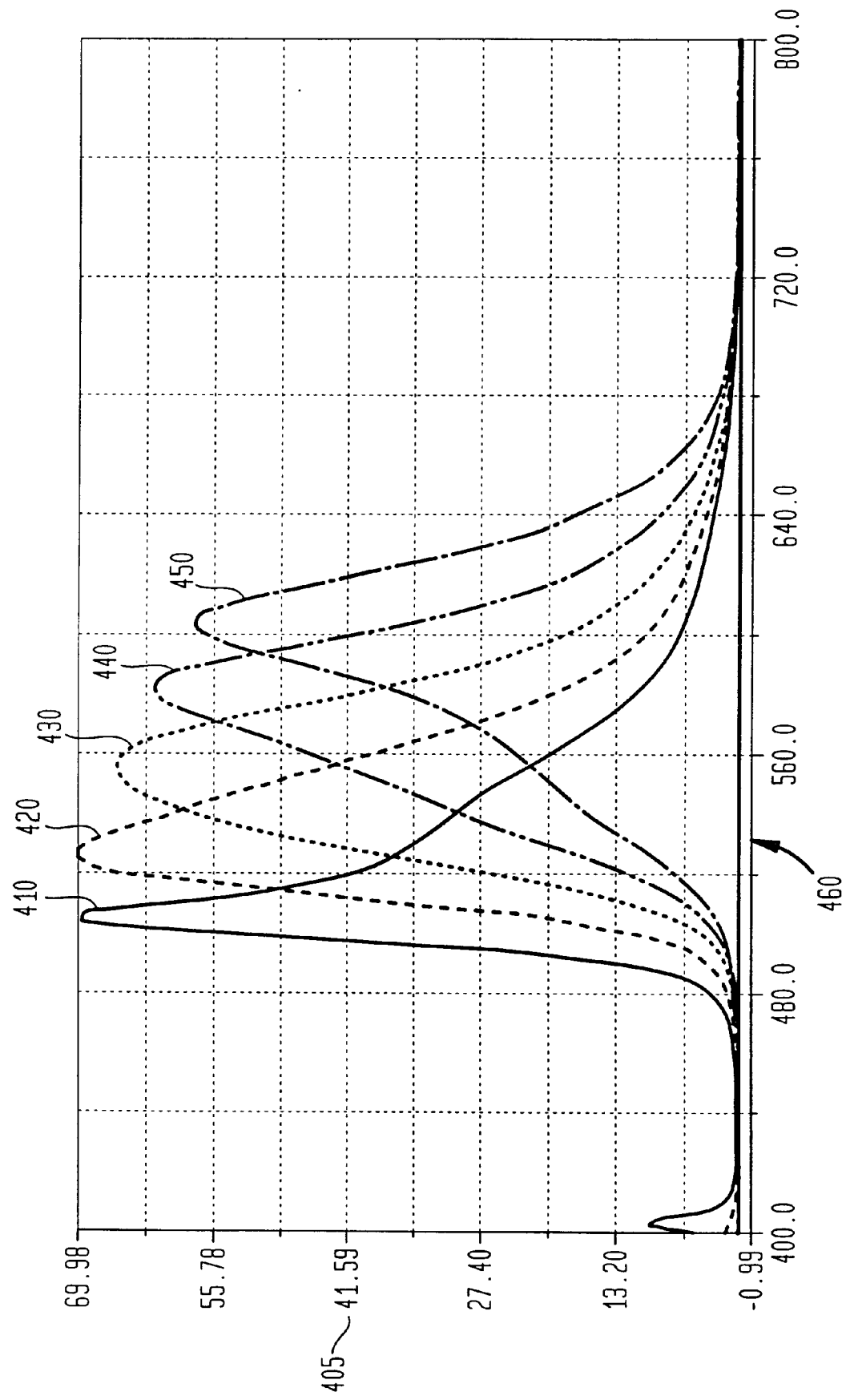
FIG. 4 is a series of transmission functions for an embodiment of an air gap device according to the present invention, each of the transmission functions corresponding to a predetermined air gap width in the air gap device.

Operation as a tunable filter is slightly different, with theoretical results illustrated in FIG. 4, wherein the percentage light propagation is the Y-axis 405 and the air gap thickness is the X-axis 460. For illustration, Silicon Nitride has been used in the following device layer configuration:

Glass substrate

| | |
|---|---|
| SI3N4 | 65.00 (mn) |
| AG | 19.00 |
| SI3N4 | 98.00 |
| AG | 20.00 |
| SI3N4 | 94.00 |
| AG | 30.00 |

AIR layer having exemplary widths 470; 490; 510; 530; and 550 nm

| | |
|---|---|
| AG | 30.00 |
| SI3N4 | 94.00 |
| AG | 20.00 |
| SI3N4 | 98.00 |
| AG | 10.00 |
| SI3N4 | 65.00 |

Glass substrate

The tunability is graphically depicted in FIG. 4 wherein the X-axis 460 is the air gap thickness in nm and the Y-axis 405 is the percentage light propagation. The design is similar to the apparatus of FIGS. 2A and 2B, except that in this embodiment the air gap thickness varies from 470 to 550 nm. In FIG. 4, transmission profiles 410, 420, 430, 440 and 450 respectively correspond to exemplary air gap thicknesses 470 nm, 490 nm, 510 nm, 530 nm and 550 nm. The graphical illustrations are by way of example only and it is understood that any variations of the air gap thickness can be used depending on the characteristics of the tunable filter desired. It is noted that it is possible to incorporate two or more air gaps in the device, which allows for greater tunability control.

Figure 5:
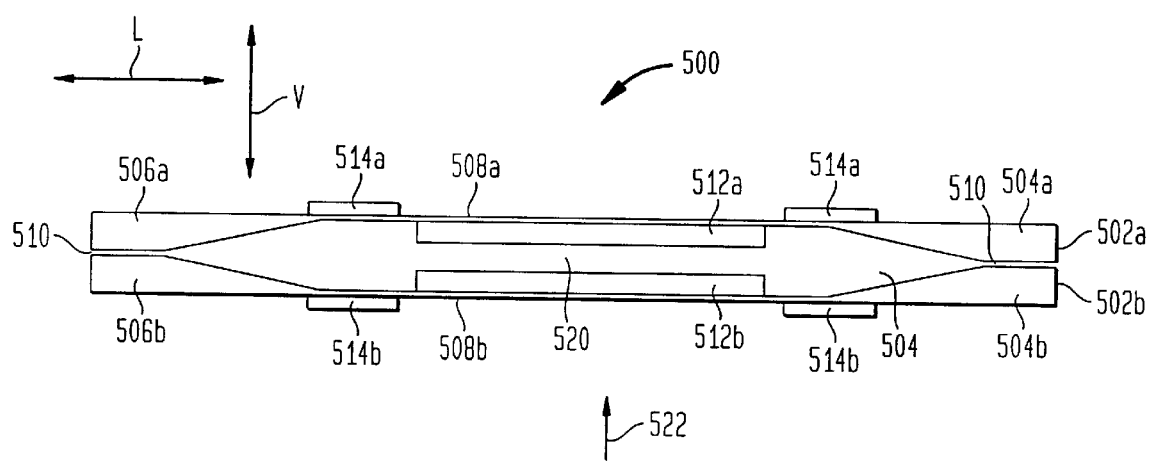
FIG. 5 is a diagram of an actual micro-electro-mechanical optical switch constructed in accordance with the present invention.

A micro-electro-mechanical optical switch 500 constructed in accordance with the principles of the present invention is depicted in FIG. 5. Switch 500 includes an upper silicon section 502a, and a substantially identical, opposing lower silicon section 502b, bonded together to form a cavity 504 between the upper and lower sections. Upper section 502a includes a pair of substrates 504a and 506a spaced apart from one another in a lateral direction L, and a transparently thin, laterally extending, flexible membrane 508a between the spaced substrates. Similarly, lower section 502b includes a pair of spaced substrates 504b and 506b and a transparently thin, laterally extending, membrane 508b between the spaced substrates. Upper and lower silicon sections 502a and 502b are bonded together at seems 510. Upper and lower silicon sections 502a and 502b can be fabricated using a bulk micro-machining technique. Also, silicon sections 502a and 502b can be made of suitable materials other than silicon.

A pair of PBG multilayer stack regions 512a and 512b, constructed in accordance with the present invention to exhibit desired optical properties, are deposited on respective inner surfaces of membranes 508a and 508b to thereby oppose one another within cavity 504. A first pair of laterally spaced actuators 514a and a second pair of laterally spaced actuators 514b opposing the first pair are respectively embedded in the outer surfaces of the upper and lower sections 502a and 502b. Actuator pairs 514a and 514b are respectively positioned at edge portions of flexible membranes 508a and 508b and control a separation or width 520b between opposing stack regions 512a and 512b by displacing the respective deformable membranes in a vertical direction V. Each actuator pair 514a/514b advantageously maintains an even or level orientation of the respective membrane 508a/508b, and thus stack region 512a/512b, while displacing the membrane in direction V because of the laterally spaced configuration of each actuator pair. Accordingly, the optical transmission of a light beam 522, directed at stack region 512b as depicted in FIG. 5, through optical switch 500 is controlled by varying separation 520 using actuator pairs 514a and/or 514b, as described above.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above described exemplary embodiments, but should be defined only in accordance with the following claims and their equivalents.

What is claimed is:

1. An apparatus for controlling light propagation, comprising:
    a transparent metal stack with at least two regions, said regions being positioned so as to have at least one air gap between said at least two regions, each of said regions including a plurality of metal layers; and
    a mechanical actuator assembly coupled with the transparent metal stack and being constructed and arranged to displace at least one of said two regions in relation to the other region to vary a width of the air gap between said regions, whereby light propagation through the transparent metal stack is controlled in accordance with the width of the air gap.

2. The apparatus for controlling light propagation of claim 1, wherein the mechanical actuator assembly includes a micro-electromechanical switch.

3. An apparatus for controlling light propagation, comprising:
    a transparent metal stack with at least two regions, said regions being positioned so as to have at least one air gap between said at least two regions; and
    mechanical actuator assembly coupled with the transparent metal stack and being constructed and arranged to displace at least one of said two regions in relation to the other region to vary a width of the air gap between said regions, whereby light propagation through the transparent metal stack is controlled in accordance with the width of the air gap;
    wherein the width of said air gap causes a variance in the index of refraction to be a factor of 2 or greater.

4. The apparatus for controlling light propagation of claim 1, wherein said at least two regions is exactly two regions, a first region and a second region, and wherein said at least one air gap is one air gap between said first region and said second region.

5. The apparatus for controlling light propagation of claim 1, wherein said at least two regions is exactly three regions, a first region, a second region and a third region, and wherein said at least one air gap is two air gaps independent in size, one air gap between said first and said second region and one air gap between said second and said third region.

6. The apparatus of claim 2, further comprising first and second substrate sections bonded together to form a cavity between the substrate sections, each substrate section including a transparently thin flexible membrane opposing the flexible membrane of the other substrate section, wherein the metal stack includes first and second opposing stack regions respectively deposited on the first and second flexible membranes to define the air gap between the first and second stack regions within the cavity, wherein the mechanical actuator assembly controls the air gap width between the first and second stack regions by displacing at least one of the flexible membranes, and an associated one of the first and second regions, toward or away from the other flexible membrane.

7. An apparatus for controlling light propagation, comprising:
    a transparent metal stack with at least two regions, said regions being positioned so as to have at least one air gap between said at least two regions;
    mechanical actuator assembly coupled with the transparent metal stack and being constructed and arranged to displace at least one of said two regions in relation to the other region to vary a width of the air gap between said regions, whereby light propagation through the transparent metal stack is controlled in accordance with the width of the air gap;
    wherein the mechanical actuator assembly includes a micro-electromechanical switch; and
    first and second substrate sections bonded together to form a cavity between the substrate sections, each substrate section including a transparently thin flexible membrane opposing the flexible membrane of the other substrate section, wherein the metal stack includes first and second opposing stack regions respectively deposited on the first and second flexible membranes to define the air gap between the first and second stack regions within the cavity, wherein the mechanical actuator assembly controls the air gap width between the first and second stack regions by displacing at least one of the flexible membranes, and an associated one of the first and second regions, toward or away from the other flexible membrane;
    wherein the mechanical actuator assembly is coupled with the first flexible membrane and is arranged and constructed to maintain a predetermined orientation of the first flexible membrane and first stack region with respect to the second stack region while displacing the first flexible membrane and first stack region to control the light propagation.

8. An apparatus for controlling light propagation, comprising:

a transparent metal stack with at least two regions, said regions being positioned so as to have at least one air gap between said at least two regions;

mechanical actuator assembly coupled with the transparent metal stack and being constructed and arranged to displace at least one of said two regions in relation to the other region to vary a width of the air gap between said regions, whereby light propagation through the transparent metal stack is controlled in accordance with the width of the air gap;

wherein the mechanical actuator assembly includes a micro-electromechanical switch; and first and second substrate sections bonded together to form a cavity between the substrate sections, each substrate section including a transparently thin flexible membrane opposing the flexible membrane of the other substrate section, wherein the metal stack includes first and second opposing stack regions respectively deposited on the first and second flexible membranes to define the air gap between the first and second stack regions within the cavity, wherein the mechanical actuator assembly controls the air gap width between the first and second stack regions by displacing at least one of the flexible membranes, and an associated one of the first and second regions, toward or away from the other flexible membrane;

wherein the mechanical actuator assembly is coupled with the first flexible membrane and is arranged and constructed to maintain a predetermined orientation of the first flexible membrane and first stack region with respect to the second stack region while displacing the first flexible membrane and first stack region to control the light propagation; and wherein the mechanical actuator assembly includes a first pair of spaced actuators contacting an outer surface of the first flexible membrane, and a second pair of spaced actuators contacting an outer surface of the second flexible membrane and positioned to oppose the first pair of actuators.

9. A method of controlling light propagation, comprising the steps of:

placing a transparent metal stack with at least two regions in the path of the light propagation that is to be controlled, said at least two regions having at least one air gap therebetween, each of said regions including a plurality of metal layers; and varying a width of said at least one air gap to establish a desired light propagation characteristics thereby control the light propagation.

10. The method of claim 9, wherein the step of varying the width of said at least one air gap is accomplished using a Micro-electro-mechanical switch.

11. A method of controlling light propagation, comprising the steps of:

placing a transparent metal stack with at least two regions in the path of the light propagation that is to be controlled, said at least two regions having at least one air gap therebetween; and varying a width of said at least one air gap to establish a desired light propagation characteristics and thereby control the light propagation;

wherein the step of varying the width of said at least one air gap is accomplished using a Micro-electro-mechanical switch; and wherein the varying step includes the step maintaining a predetermined orientation of the at least two regions while varying the width of the at last one air gap.

12. A method of controlling light propagation, comprising the steps of:

placing a transparent metal stack with at least two regions in the path of the light propagation that is to be controlled, said at least two regions having at least one air gap therebetween; and varying a width of said at least one air gap to establish a desired light propagation characteristics and thereby control the light propagation;

wherein said varying step varies the index of refraction by a factor of 2 or more.

* * * * *